United States Patent [19]

Roden

[11] Patent Number: 5,189,514
[45] Date of Patent: Feb. 23, 1993

[54] GUIDANCE SYSTEM FOR AUTOMATIC RIVETERS

[75] Inventor: William A. Roden, San Diego, Calif.

[73] Assignee: General Dynamics Corporation Convair Division, San Diego, Calif.

[21] Appl. No.: 751,462

[22] Filed: Aug. 29, 1991

[51] Int. Cl.$^5$ ............................................. H04N 5/225
[52] U.S. Cl. .................................... 358/125; 358/101; 358/107; 382/8
[58] Field of Search ................ 358/101, 107, 105, 125, 358/126, 106; 382/8, 18

[56] References Cited

U.S. PATENT DOCUMENTS

| | | |
|---|---|---|
| 4,021,840 | 5/1977 | Ellsworth et al. ................ 358/101 |
| 4,254,433 | 3/1981 | Dewar, Jr. et al. .............. 358/125 |
| 4,305,096 | 12/1981 | Yokoshima et al. ............... 358/101 |
| 4,468,695 | 8/1984 | Ikeda et al. ................... 358/101 |
| 4,567,348 | 1/1986 | Smith et al. ................... 358/101 |
| 4,688,088 | 8/1987 | Hamazaki et al. ................ 358/101 |
| 4,734,766 | 3/1988 | Shiozumi et al. ................ 358/101 |
| 4,918,517 | 4/1990 | Burgoon ........................ 358/101 |

Primary Examiner—James J. Groody
Assistant Examiner—Michael H. Lee
Attorney, Agent, or Firm—John R. Duncan; Frank D. Gilliam

[57] ABSTRACT

An optical edge guidance system for automatic riveters. The guidance system utilizes a light source which directs light toward the material to be drilled/riveted, a video camera is also directed toward the portion of an object to be drilled/riveted and detects reflected source light from the material. The light from the source directed toward the material is angled about 10 to 15 degrees from the vertical. The material either is marked with a dark stripe or, for example, when the material cross-section is in the shape of a hat section, i.e. an aircraft longeron, a shadow is cast by the light striking the edge of the material and forms a dark area along the longitudinal centerline thereof. The edge of the dark stripe or shadow is detected by the video camera. The video signal from the camera is processed into a voltage equivalent of the video signal. A known reference voltage signal is established when the material positioned properly for drilling/riveting. If this reference voltage signal varies either plus or minus the drill/rivet head is repositioned until the reference voltage is again re-established. The drill/rivet head is moved by means of a servo motor drive controlled by the reference voltage signal which translates the head according to the amount of plus or minus voltage signal from the reference voltage until the exact reference voltage is again achieved for proper drilling/riveting head location.

9 Claims, 1 Drawing Sheet

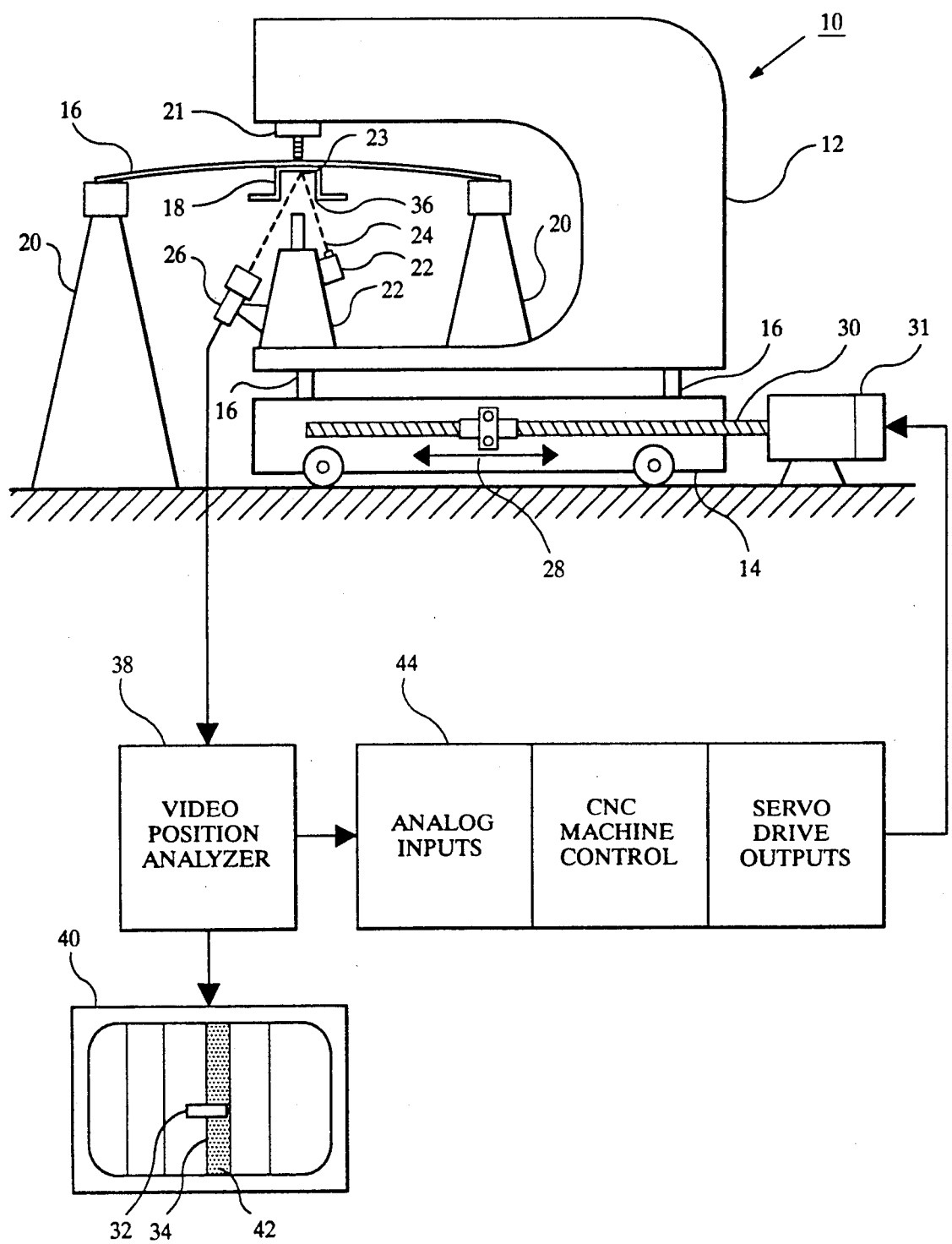

GUIDANCE SYSTEM FOR AUTOMATIC RIVETERS

BACKGROUND OF THE INVENTION

This in general to the tracking of the position of material translating during the operation of work thereon and, more specifically, to a system for accurate guidance of a drill/rivet head while drilling and riveting together two pieces of material, ie. one positioned over the other whereby the drilling/riveting is precisely located as it translates along the material drilling/riveting a plurality of locations therealong.

A number of different systems have been developed for guiding a welding torch along a desired path relative to a workpiece during welding. The most simple arrangements merely move the welder or workpiece along a preselected path. These arrangements tend to be relatively inaccurate, since the moving mechanism will generally not exactly follow the ideal path. Moving very large workpieces past a welding station without deviating from the intended path is very difficult. Also, these systems do not provide for irregularities in workpiece size or shape. Because of these problems, a number of seam tracking systems have been developed. Many use a mechanical servo arrangement in which a sensor or feeler rides along the seam ahead of the welding head. However, these do not provide precisely accurate tracking because of mechanical backlash and the need to have the sensor sufficiently far ahead of the welder to avoid interference with the welding operation. The greater the separation between sensor and welder, the greater the chance for error resulting from seam irregularities between the two locations. Also, mechanical systems are only usable with joints having gaps large enough to receive the sensing means.

In an attempt to provide tracking of seams in structures of widely varying shapes, U.S. Pat. No. 3,575,364 provides a flexible track secured to the structure adjacent to the seam. While this system has a variety of applications, its accuracy is limited by the accuracy of track placement.

Attempts have been made to use electronic sensing and control of seam welders. For example, the system disclosed in U.S. Pat. No. 3,532,807 uses a television camera guided servo system. However, this system used television scanning parallel to the weld seam, resulting in an unstable video signal making detection unreliable, especially with curved structures or seams. Also, the use of a closed loop servo system requires both torch and camera be mounted on a single carriage, with attendant problems of magnetic interference to the camera, vibration transmission to the camera and carriage size.

In U.S. Pat. No. 4,021,840, of which I am a coinventor, teaches the use of a video camera for use in a welding system for automatically tracking the seam to be welded. This system is very successful for the purpose for which it is designed, but is very expensive for use where the light source can be controlled rather than where the light source is the weld arc which requires excessive dampening and filtering of the weld arc to a usable light source for the camera to prevent destruction of the camera light pick up sensor.

Thus, there is a continuing need for an improved tracking system for welders and drill/rivet devices.

SUMMARY OF THE INVENTION

It is, therefore, an object of this invention to provide a drill/rivet system overcoming the above noted problems.

Another object of this invention is to provide a drill/rivet head tracking system of improved accuracy.

A further object of this invention is to provide a drill/rivet head tracking welding system of improved simplicity and reliability.

Yet another object of this invention is to provide a convenient arrangement for observing the operation of the tracking system.

The above objects, and others, are accomplished in accordance with this invention by an automatic servo driven drill/rivet head tracking system employing a television camera as an optical sensor.

A conventional television camera is directed to the edge between light and a darkened area along the under side of one of two pieces of material one being positioned over the other for rivet joining by the partial blocking of light from a light source do to the angle of the light source and the configuration of the material or by a dark line positioned thereon along the area to be drilled/riveted with the line-scan oriented substantially perpendicular to the darkened area. The camera is gated so that it senses only a small area of the material and can detect the edge of the darkened area a which is normally much darker than the surrounding material. The camera produces a voltage pulse which exactly coincides with the point in time at which the line-scan intercepts the edge of the darkened area. This voltage pulse is fed into a video position analyzer, the output of which is a D.C. voltage proportional to the time incidence of the scan pulse is referenced to the standard horizontal synchronization pulse (the initiation of the line-scan) of the camera. The output of the video position analyzer is fed into a video monitor and into a CNC machine controller. The output of the CNC machine controller is fed into a Y axis motor/encoder which operates a ball screw to position the drill/ rivet head transverse to its normal movement. As the reference voltage level goes either plus or minus from its predetermined level the ball screw will rotate either clockwise or counter clockwise until the reference voltage level is re-established and the drill/rivet head is again properly positioned for the drilling/riveting operation.

BRIEF DESCRIPTION OF THE DRAWING

The drawing depicts a schematic block diagram showing of the device of the present invention.

DETAILED DESCRIPTION OF THE DRAWING

Referring now to the drawing Figure in detail. A drilling/riveting machine 10 is shown having a large "C" shaped frame 12. The frame 12 is translatably mounted on base 14 through supports 16 which are guided by a track or the like, not shown. The movement of the frame 12 is toward and away from the viewer. An aircraft skin 16 and a longeron 18 having a hat shaped cross-section to be drilled/riveted are supported between two upright supports 20 in a position between a drill/rivet head 21 and an anvil member 22.

In a conventional manner the "C" frame 12 will move either toward or a way from the viewer of the figure along an "X" axis stopping at predetermined locations to drill a hole through the skin 16 and the longeron 18 and insert and squeeze the inserted rivet in a conventional manner to fixedly secure the skin to the longeron.

A suitable light source 24 is carried by the anvil member 22 and is directed toward the underside 23 of the longeron at an angle from 10 to 15 degrees off vertical. A television camera 26 of the type 6810 manufactured by Cohu or an equivalent thereto is carried on the opposite side of the anvil member 22 and is directed toward the underside 23 of the longeron. The direction of the light from the light source is positioned relative to the edge of the longeron so that as the light strikes the edge, a shadow is cast longitudinally along a portion of the underside of the longeron in the direction of the movement of frame 12. It should be understood that if material having a shape different from that of the longeron is to be drill/riveted to a second piece of overlaying material, ie. where no shadow is present, that a dark line shadow equivalent could be placed on the underside of the material along the drill/rivet line to accomplish the same purpose as the shadow.

The base 14 is translatable along a "Y" axis shown by arrows 28 transverse to the direction of the drill/rivet head and anvil 22. The base is translated by a ball screw 30 rotated either clockwise or counter clockwise by a "Y" axis drive motor/incoder 31 of the type 7900 manufactured by Allen Bradley or an equivalent thereof.

In operation the rivet/drill head 21 moves along the "X" axes predetermined distances stops, drills and positions and squeezes a rivet and then moves to the next predetermined location where the drilling/riveting operation is repeated and so on until the joining of the skin to the longeron is completed. In order to maintain the drill/rivet head in the correct position along a predetermined bond line, ie the longitudinal center of the longeron, the television camera 26 views the underside of the longeron and is gated so that only a small portion 32 of the edge 34 between light and dark of the shadow 36 on the underside 23 of the longeron 18 is viewed.

The gated signal from the television camera is fed into a video position analyzer 38 of the Type 635 manufactured by Colorado Video or an equivalent thereto. The video position analyzer provides a video output signal to a video monitor 40 on which the gated area 32, shadow 42 and shadow edge 34 can be visually monitored and a signal voltage level equivalent to the edge location 34 of the shadow is supplied to the analog input 44 of a CNC machine control 46 of a model 8200 manufactured by Allen-Bradley or an equivalent thereto. The servo drive output 48 of the CNC machine control supplies a voltage level equivalent to the position of the shadow edge as viewed by the camera. The output voltage of the CNC machine control supplies a voltage to the "Y" axis drive motor 31 operating the motor either clockwise or counter clockwise, rotating the ball screw accordingly thereby translating the base 14 along the "Y" axis.

In the initial set up, the drill/riveting head is correctly positioned relative to the shadow edge. In this position the camera provides a known reference voltage level at the input of the CNC machine control 44. When this reference voltage is present at the input of the CNC machine control there is no output voltage to the "Y" axis drive motor 31 and the motor 31 is inoperative. When the camera gated area 32 moves away from the shadow edge 34 the reference voltage either increases or deceases depending which way the shadow edge is displaced, ie. the voltage present at the input of the CNC control when off shadow edge will be either greater or less than the reference voltage. This amount of difference will cause the CNC machine controller to supply a voltage to the "Y" axis drive motor 31 causing the motor 31 to rotate in a direction that returns the input voltage to the CNC control back to the reference level, ie. the gated area again detects the shadow edge. In this manner the base 14 translates back and forth as required to maintain the reference voltage at the input of the CNC controller and thereby maintain the drilling/riveting head in the correct position as it travels along the "X" axis.

A complete discussion of the video camera and its theory of operation is fully described in U.S. Pat. No. 4,021,840.

Although specific arrangements and components have been described in the above description of a preferred embodiment, other arrangements, circuit subcombinations and components may be used, where suitable, with similar results. Other modifications, applications and ramifications of the present invention will become apparent to those skilled in the art upon reading the present disclosure. They are intended to be included within the scope of this invention as defined in the appended claims.

What is claimed is:

1. An automatic tracking system for tracking a selected area of an object translating along a selected axis comprising:
   a first translating means for translating said object along said selected axis;
   an indicator means having an edge positioned along said selected axis;
   detecting means for detecting the location of said edge of said indicator means and producing a voltage relative to the position of said edge relative to said detecting means, said voltage being of a known value when said edge is correctly positioned relative to said detecting means and being less or greater than said known value when said edge is not correctly positioned relative to said detecting means; and
   a second translating means for translating said object normal to said selected axis until said edge is correctly positioned and continually maintaining that correct position thereof as said object is translated along said selected axis, said second translating means having an upper supporting surface and said first translating means being carried on said upper supporting surface of said second translating means for relative movement therebetween.

2. The automatic tracking system of claim 1 wherein said indicator means is formed by a shadow cast along said selected area of said object.

3. The automatic tracking system of claim 2 wherein said shadow is created by a light shining on said object and partially blocked thereby.

4. The automatic tracking system of claim 3 wherein said shadow forms a edge between light and dark.

5. The automatic tracking system of claim 1 wherein said indicator means is a finite dark line along said selected axis.

6. The automatic tracking system of claim 1 wherein said detecting means is a video camera connected to a video position analyzer, said analyzer producing a voltage signal corresponding the location of said edge of said indicator means relative to said video camera.

7. The automatic tracking system of claim 6 further comprising a controller means for causing said translating means to translate said object on an axis normal to said selected axis when said voltage signal indicates that said object is translating off said selected axis for re-positioning said object back on said selected axis.

8. The automatic tracking system of claim 7 wherein said controller means comprises a CNC machine controller which supplies a voltage to a normal axis drive motor which translates said object for re-positioning.

9. The automatic tracking system of claim 2 wherein said detecting means includes a video monitor for visually monitoring the relative positions of said edge and said indicating means.

* * * * *